(12) United States Patent
Luo (10) Patent No.: US 10,264,202 B2
(45) Date of Patent: Apr. 16, 2019

(54) READOUT CIRCUIT AND SENSING DEVICE

(71) Applicant: Silicon Optronics, Inc., Hsinchu (TW)

(72) Inventor: Xiaodong Luo, Hsinchu (TW)

(73) Assignee: SILICON OPTRONICS, INC., Hsinchu (TW)

( * ) Notice: Subject to any disclaimer, the term of this patent is extended or adjusted under 35 U.S.C. 154(b) by 0 days.

(21) Appl. No.: 15/843,782

(22) Filed: Dec. 15, 2017

(65) Prior Publication Data

US 2018/0359441 A1    Dec. 13, 2018

(30) Foreign Application Priority Data

Jun. 12, 2017 (TW) .............................. 106119425 A (51) Int. Cl.
*H04N 5/378* (2011.01)
*H04N 5/374* (2011.01)

(52) U.S. Cl.
CPC ............. *H04N 5/378* (2013.01); *H04N 5/374* (2013.01)

(58) Field of Classification Search
None
See application file for complete search history.

(56) References Cited

U.S. PATENT DOCUMENTS

| 8,754,956 B2 * | 6/2014 | Lim ....................... H04N 5/378 348/222.1 |
| 2012/0153123 A1 | 6/2012 | Mao et al. |
| 2015/0077598 A1 | 3/2015 | Luo |

FOREIGN PATENT DOCUMENTS

| CN | 101305602 A | 11/2008 |
| TW | 201540071 A | 10/2015 |
| TW | 201626783 A | 7/2016 |

* cited by examiner

*Primary Examiner* — Mark T Monk
(74) *Attorney, Agent, or Firm* — Muncy, Geissler, Olds & Lowe, P.C.

(57) ABSTRACT

A readout circuit is provided to generate an image datum representing an image sensed by a sensing array. The readout circuit includes a sample and hold circuit, an analog-digital conversion circuit, first and second memory banks, and an output circuit. The sample and hold circuit performs a sample and hold operation on at least one output signal from the sensing array to generate first and second sample-hold signals. The analog-digital conversion circuit generates first and second output datums according to the first and second sample-hold signals respectively. When the readout circuit operates in a first mode, the output circuit outputs the first and second output datums, received from the first and second memory banks, sequentially to serve as the image datum. When the readout circuit operates in a second mode, the output obtains difference between the first and second output datums to serve as the image datum.

19 Claims, 5 Drawing Sheets

READOUT CIRCUIT AND SENSING DEVICE

CROSS REFERENCE TO RELATED APPLICATIONS

This Application claims priority of Taiwan Patent Application No. 106119425, filed on Jun. 12, 2017, the entirety of which is incorporated by reference herein.

BACKGROUND OF THE INVENTION

Field of the Invention

The invention relates to a readout circuit, and more particularly, to readout circuit which can selectively operate in a single-ramp mode or a dual-ramp mode.

Description of the Related Art

Complementary metal oxide semiconductor (CMOS) image sensors have been widely used in a variety of applications, such as digital cameras, deoxyribonucleic acid (DNA) sensors, etc. In order to improve the sensing quality of an image sensor, the readout circuit of the image sensor generally performs a correlated double sampling (CDS) on the sensing signals generated by the sensing array to eliminate noise, such as the fixed pattern noise (FPN) induced by the nonuniformity of the sensing pixels. For an image sensing device, the readout circuit uses one ramp mode (such as single-ramp mode or dual-ramp mode) to convert sensing signals to digital signals/datums. Since the single-ramp mode and the dual-ramp mode have different drawbacks, a readout circuit which uses only one of the single-ramp mode and the dual-ramp mode cannot take optimized balance between image quality and frame rate.

BRIEF SUMMARY OF THE INVENTION

One exemplary embodiment of a readout circuit is provided. The readout circuit generates an image datum to represent an image sensed by a sensing array. The readout circuit comprises a sample and hold circuit, an analog-digital conversion circuit, a first memory bank, a second memory bank, and an output circuit. The sample and hold circuit performs a sample and hold operation on at least one output signal from the sensing array to generate a first sample-hold signal and a second sample-hold signal. The analog-digital conversion circuit receives the first sample-hold signal and the second sample-hold signal and generates a first output datum and a second output datum according to the first sample-hold signal and second sample-hold signal respectively. The first memory bank stores the first output datum. The second memory bank stores the second output datum. The output circuit is coupled to the first memory bank and the second memory bank to receive the first output datum and the second output datum. When the readout circuit operates in a first mode, the output circuit outputs the first output datum and the second output datum sequentially to serve as the image datum. When the readout circuit operates in a second mode, the output obtains difference between the first output datum and second output datum to serve as the image datum.

Another exemplary embodiment of a sensing device is provided. The sensing device comprises a sensing array, a plurality of bit lines, and a readout circuit. The sensing array comprises a plurality of sensing pixels arranged in a plurality of columns and a plurality of rows. The bit lines are coupled to the sensing array. The sensing pixels arranged in the same column are coupled to the same bit line. The readout circuit is coupled to the plurality of bit lines. The readout circuit generates a plurality of image datums to represent an image sensed by the sensing array. The readout circuit comprises a plurality of readout units coupled to the bit lines respectively. Each readout unit generates one corresponding image datum and comprises a sample and hold circuit, an analog-digital conversion circuit, a first memory bank, a second memory bank, and an output circuit. The sample and hold circuit is coupled to the corresponding bit line to receive at least one output signal. The sample and hold circuit performs a sample and hold operation on the at least one output signal to generate a first sample-hold signal and a second sample-hold signal. The analog-digital conversion circuit receives the first sample-hold signal and the second sample-hold signal and generates a first output datum and a second output datum according to the first sample-hold signal and second sample-hold signal respectively. The first memory bank storing the first output datum. The second memory bank storing the second output datum. The output circuit is coupled to the first memory bank and the second memory bank to receive the first output datum and the second output datum. When the readout circuit operates in a first mode, the output circuit outputs the first output datum and the second output datum sequentially to serve as the image datum. When the readout circuit operates in a second mode, the output obtains difference between the first output datum and second output datum to serve as the corresponding image datum A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
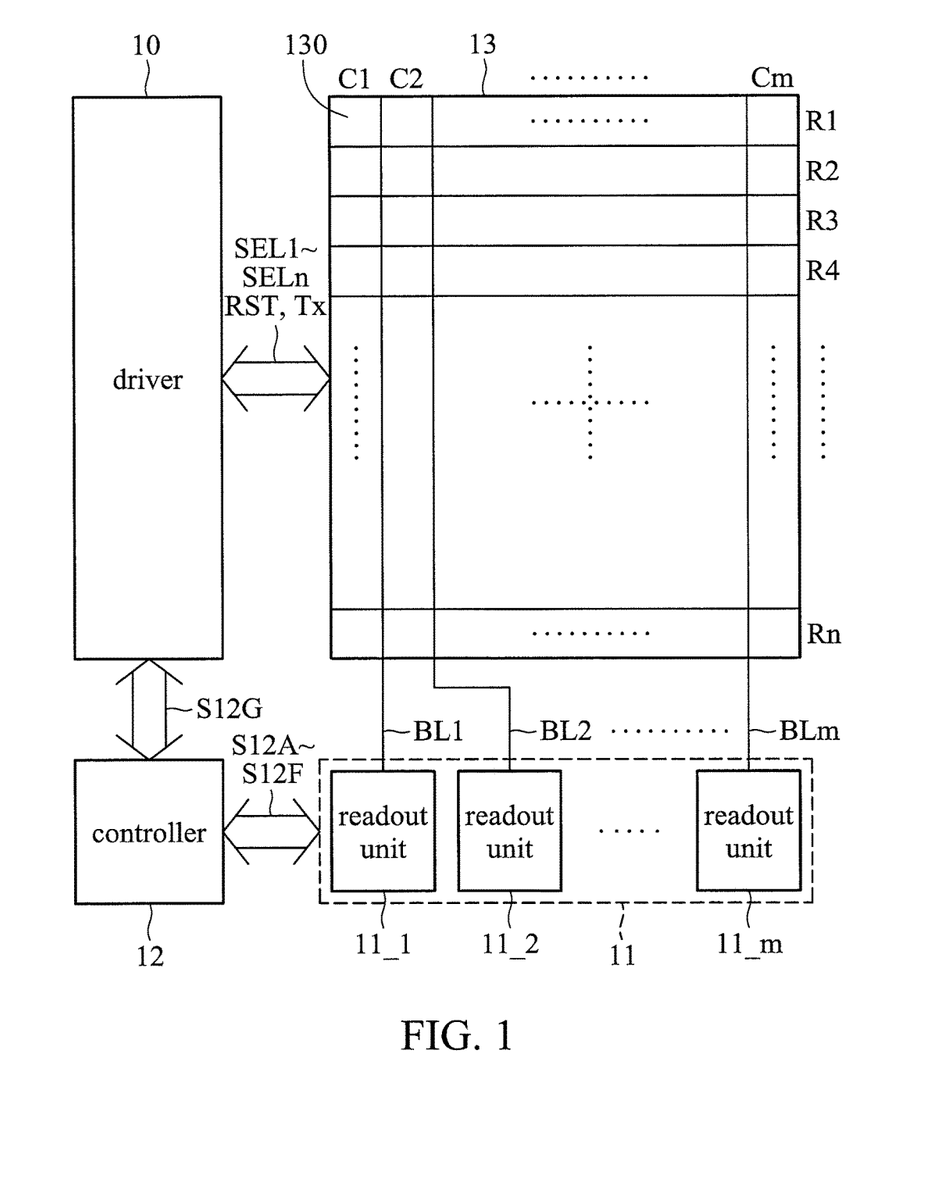
FIG. 1 shows an exemplary embodiment of a sensing device.

FIG. 1 shows an exemplary embodiment of a sensing device. Referring to FIG. 1, a sensing device 1 comprises a driver 10, a readout circuit 11, a controller 12, and a sensing array 13. The sensing array 13 comprises a plurality of sensing pixels 130. As shown in FIG. 1, the sensing pixels 130 are arranged in a plurality of columns C1~Cm and a plurality rows R1~Rn, wherein each of m and n is a positive integer which is larger than or equal to 1. The sensing pixels 130 arranged in the same column are coupled to the same bit line. Thus, the sensing device 1 comprises m bit lines BL1~BLm which correspond to the columns C1~Cm respectively. The driver 10 generates various signals to control the sensing pixels 130 for performing an image sensing operation. The signals generated by the driver 10 comprises reset signals RST, transfer signals TX, and selection signals SEL1~SELn to control the sensing pixels 130. Note that, the sensing pixels 130 arranged in the same row are controlled by the same selection signal. In details, the selection signals SEL1~SELn control the sensing pixels 130 arranged in the rows R1~Rn respectively. Referring to FIG. 1, the readout circuit 11 comprises a plurality of readout units 11_1~11_m which are respectively coupled to the bit lines BL1~BLm to generate image datums DOUT1~DOUTm representing the images sensed by the sensing array 13. Accordingly, the sensing pixels 130 arranged in the same column are coupled to the corresponding readout unit through the same bit line. In other words, the signals generated by the sensing pixels 130 arranged in the same column are read by the same readout unit to generate the corresponding image datum. The controller 12 generates at least one timing control signal S12G for the driver 10 to control the timing used to generate the signals RST, TX, and SEL1~SELn. The controller 12 further generates various signals S12A~S12G which are used to control the readout circuit 11 (the details will be described in the later paragraphs).

Figure 2A:
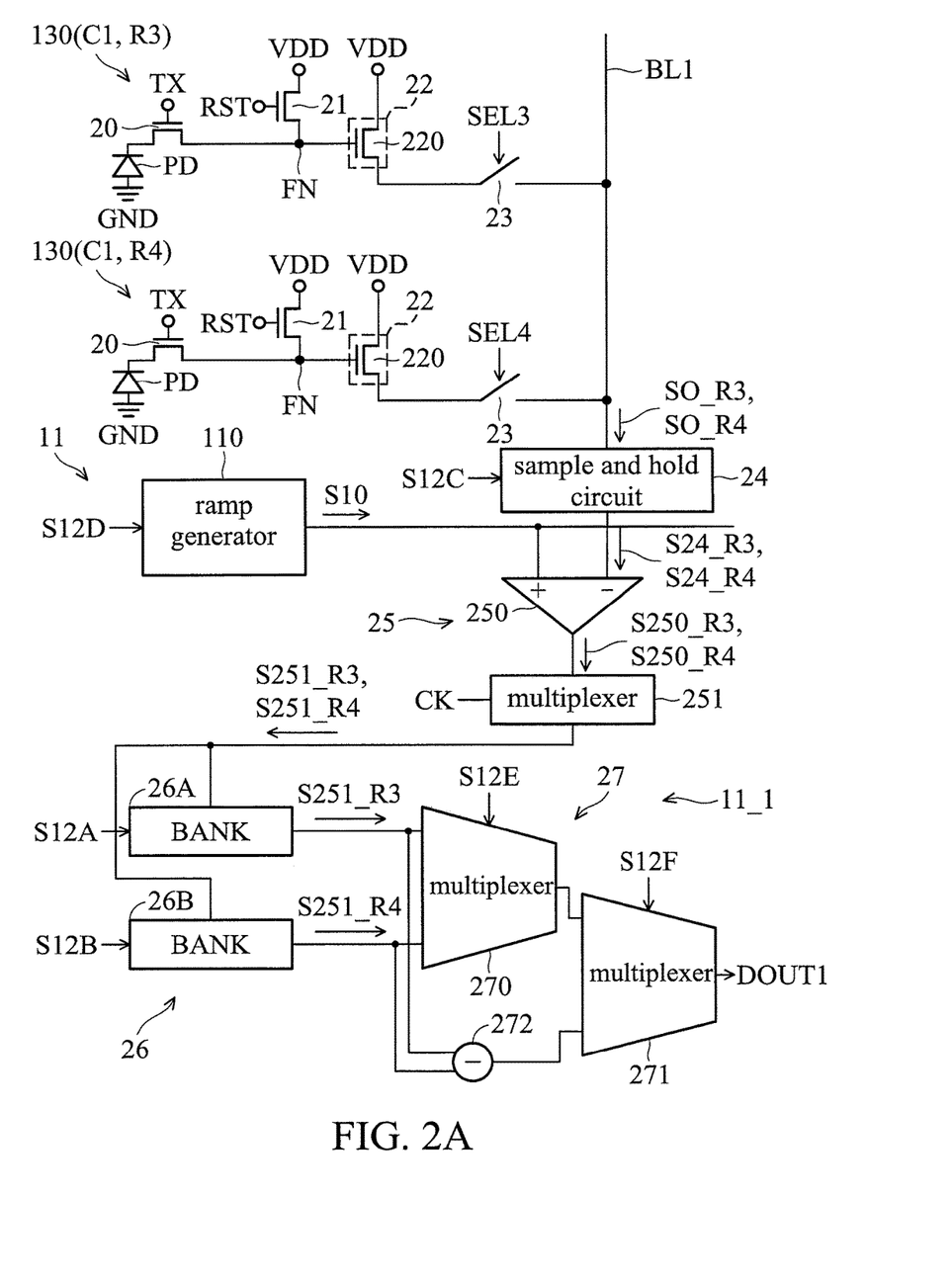
FIG. 2A shows a schematic view showing an operation of a sensing device in a single-ramp mode according to an exemplary embodiment.
Figure 2B:
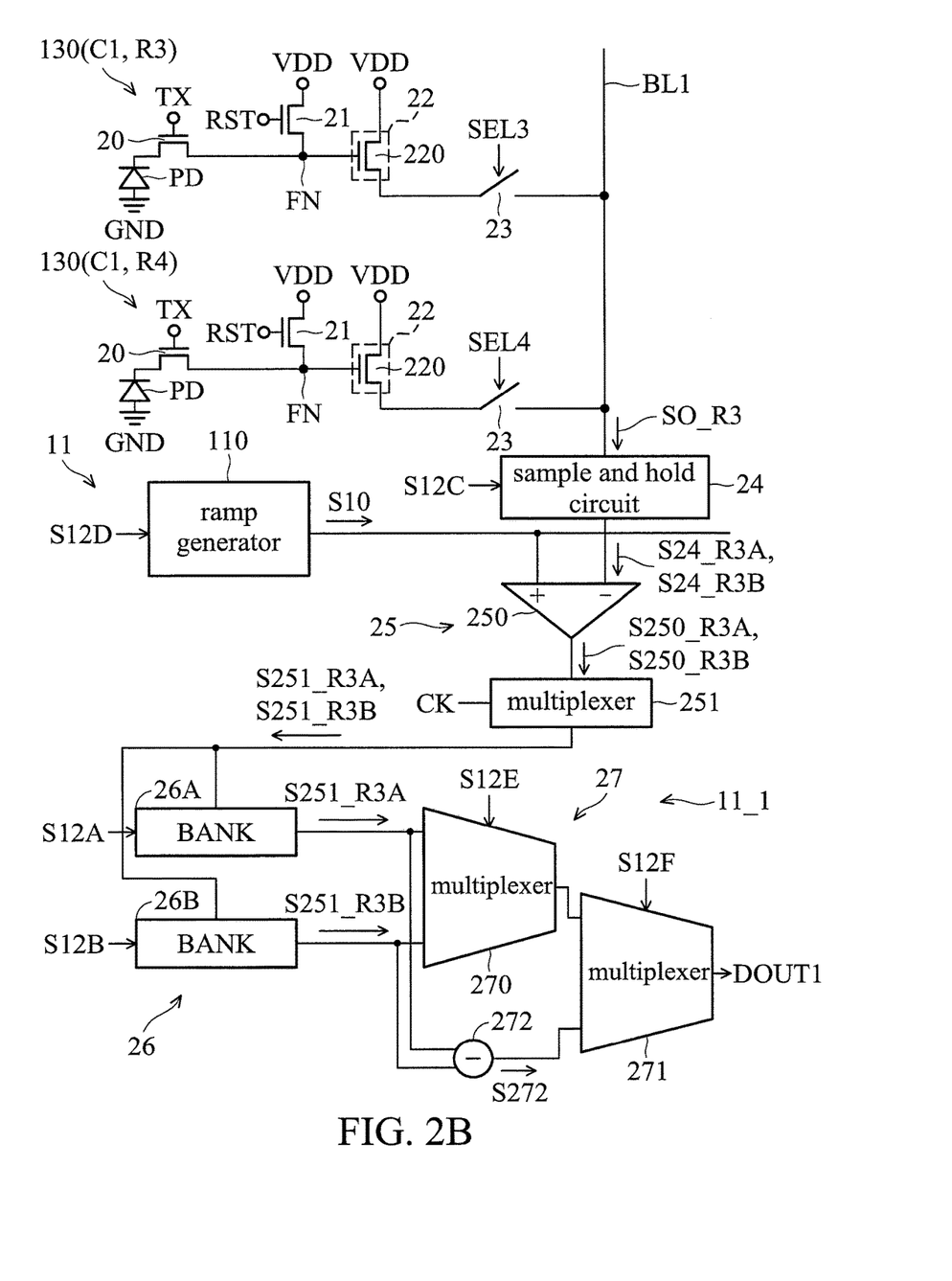
FIG. 2B shows a schematic view showing an operation of a sensing device in a dual-ramp mode according to an exemplary embodiment.

In the embodiment of FIG. 1, the structures of the sensing pixels are determined according to the design of the sensing device 1. FIGS. 2A and 2B shows the structures of the sensing pixels 130 and the readout circuit 11 according to an exemplary embodiment. In order to clear shows the structures of the sensing pixels 130, FIGS. 2A and 2B show only two sensing pixels 130 arranged in the same column, such as the sensing pixel 130 (represented by the reference sign 130(C1,R3)) arranged in the column C1 and the row R3 and the sensing pixel 130 (represented by the reference sign 130(C1,R4)) arranged in the column C1 and the row R4. The structures of the other sensing pixels 130 are the same as the structures shown in FIGS. 2A and 2B. Moreover, FIGS. 2A and 2B show only the readout unit 11_1 corresponding to the column C1. The structures of the other readout units are the same as the structure shown in FIGS. 2A and 2B.

As shown in FIG. 2A, the sensing pixel 130(C1,R3) comprises a sensing element PD, a transfer transistor 20, a reset transistor 21, a source follower 22, and a selection switch 23. In the embodiment, the source follower 22 comprises an output transistor 220. The input terminal of the source follower 22 is coupled to the floating diffusion node FN. In the embodiment of FIG. 2A, the transistors 20, 21, and 220 are implemented by N-type metal-oxide semiconductor, NMOS). Referring to FIG. 2A, the sensing element PD is implemented by a photoelectric diode whose anode is coupled to the ground GND. The gate (control terminal) of the transfer transistor 20 receives the transfer signal TX, the drain (input terminal) thereof is coupled to the cathode of the photoelectric diode PD, and the source (output terminal) thereof is coupled to the floating diffusion node FN. The gate of the reset transistor 21 receives the reset signal RST, the drain thereof is coupled to a voltage source VDD, and the source thereof is coupled to the floating diffusion node FN. The gate of the output transistor 220 serves as the input terminal of the source follower 22 and is coupled to the floating diffusion node FN. The drain of the output transistor 220 is coupled to the voltage source 220, and the source thereof is coupled to the bit lint BL1 through the selection switch 23. The on/off state of the selection switch 23 is controlled by the corresponding selection signal SEL3. The corresponding readout unit 11_1 is coupled to the output terminal of the selection switch 23 through the bit line BL1. The sensing pixel 130(C1,R4) has the same elements and circuit structure of the sensing pixel 130(C1,R4). Note that, since the sensing pixel 130(C1,R4) is arranged in the row R4, the on/off state of the selection switch 23 of the sensing pixel 130(C1,R4) is controlled by the corresponding selection signal SEL4. The above structures of the sensing pixels are given as an example. In other embodiments, the sensing pixels may have different structures which are modified based on the structure of FIG. 2A.

Referring to FIG. 2A, the readout circuit 11 further comprises a ramp generator 110 which is controlled by the control signal S12D generated by the controller 12 to generate a ramp signal S110 having at least one ramp pulses. The readout unit 11_1 comprises a sample and hold circuit 24, an analog-digital conversion circuit 25, a memory 26, and an output circuit 27. The sample and hold circuit 24 is coupled to the bit line BL1. The sample and hold circuit 24 is composed of capacitors and switches. The sample and hold circuit 24 is controlled by at least one control signal S12C generated by the controller 12 to perform a sample and hold operation on an output signal on the bit line BL1 and generate a corresponding sample-hold signal. In the embodiment of FIG. 2A, the analog-digital conversion circuit 25 comprises a comparator 250 and a counter 251. One input terminal (such as the negative input terminal (−)) of the comparator 250 is coupled to the output terminal of the sample and hold circuit 24, and the other input terminal (such as the positive input terminal (+)) thereof receives the ramp signal S110. The counter 251 is coupled to the output terminal of the comparator 250 and receives a clock signal CK to serve as a base clock for a counting operation performed by the counter 251. The memory 26 comprises at least two memory banks. In the embodiment, the memory 26 comprising two memory banks (BANK) 26A and 26B is given as an example. The memory 26 can be implemented by a static random-access memory SRAM. The memory banks 26A and 26B are controlled by the control signals S 12A and S12B generated by the controller 12 respectively, so that the memory 26 can selectively store the datum from the counter 251 into the memory bank 26A or 26B. The output circuit 27 comprises multiplexers (MUX) 270 and 271 and a subtracter 272. One input terminal of the multiplexer 270 is coupled to the memory bank 26A to receive the datum from the memory bank 26A, and the other input terminal thereof is coupled to the memory bank 26B to receive the datum from the memory bank 26B. The multiplexer 270 selectively transmits the datum at one of the input terminals to its output terminal according to the control signal S12E. The subtracter 272 is coupled to the memory banks 26A and 26B to receive the datum from the memory banks 26A and 26B respectively. The substracter 272 performs a subtraction operation on the datum from the memory bank 26A and the datum from the memory bank 26B. One input terminal of the multiplexer 271 is coupled to the output terminal of the multiplexer 270, and the other input terminal thereof is coupled to the output terminal of the substracter 272. The multiplexer 271 selectively transmits the datum at one of the input terminals to its output terminal according to the control signal S12F to serve as the image datum Dout1 of the readout unit 11_1.

As described above, the sensing pixels 130 arranged in the same column are coupled to the same readout unit through the corresponding bit line. According to the selection signals SEL1~SELn generated by the driver 10, the driver 10 drives all the sensing pixels 130 in the same row each time to perform the sensing operation. Thus, the sensing pixels 130 arranged in the same column and in the different rows can perform the sensing operation at different times, and the corresponding readout units perform the readout operation for the sensing pixels 130 arranged in the same column at different times. When the sensing device 1 plans to sense images by the sensing pixels 130 arranged in one row (such as the row R3), all the selection switches 23 of the sensing pixels 130 arranged in the row R3 are turned on according to the selection signal SEL3 for the sensing operation. In the following, the sensing pixel 130(C1,R3) arranged in the column C1 and the row R3, the sensing pixel 130(C1,R4) arranged in the column C1 and the row R4, and the readout unit 11_1 are given as an example for the illustration of the sensing operation and the readout operation.

Figure 3:
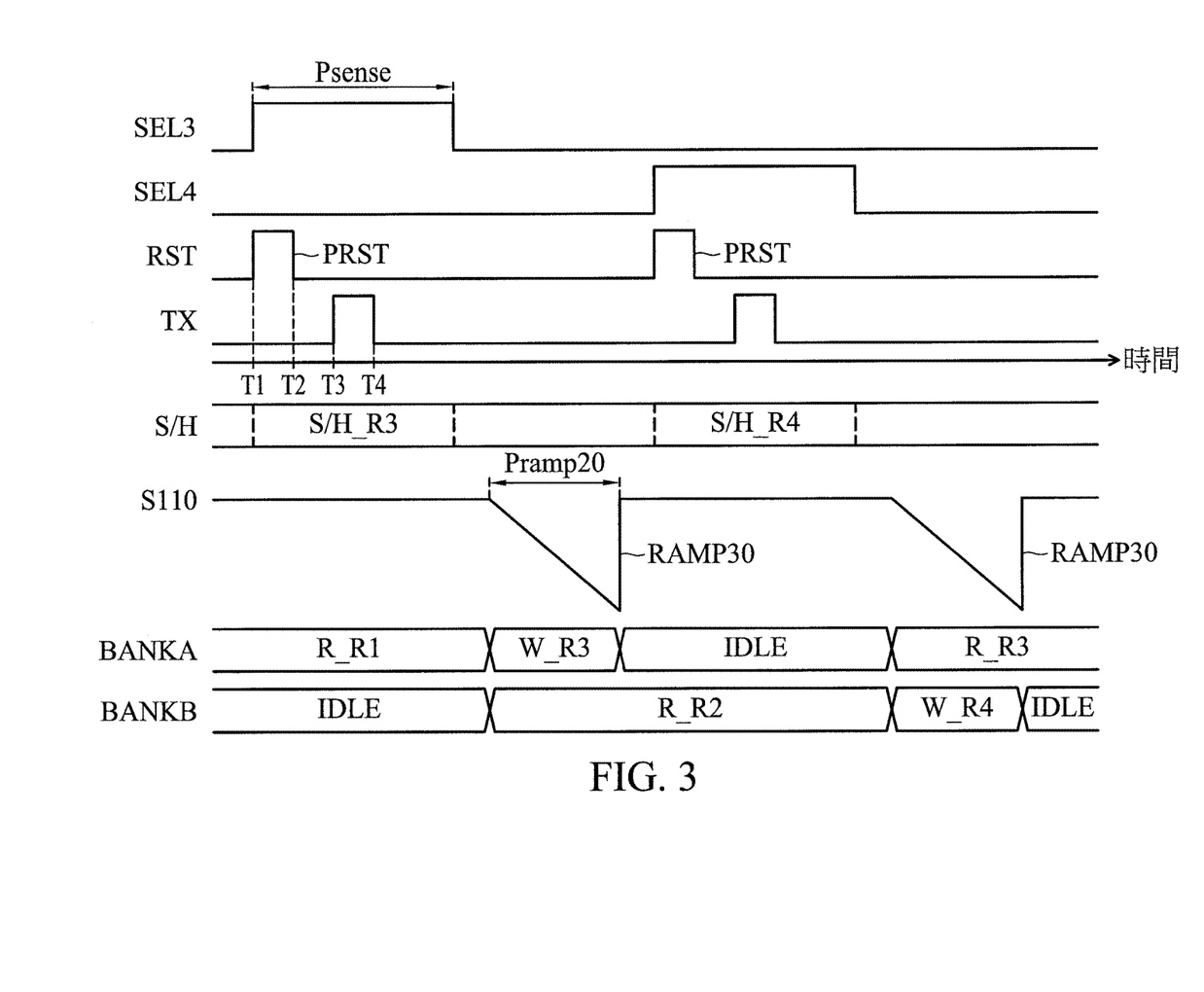
FIG. 3 shows a timing chart of main signals of a sensing device in a single-ramp mode according to an exemplary embodiment.

FIG. 2A also shows the schematic view of the operation of the sensing device 1 in the single-ramp mode. FIG. 3 shows the timing chart of the main signals of the sensing device 1 in the single-ramp mode. Referring to FIGS. 2A and 3, the selection signal SEL3 is at a high voltage level to turn on the selection switch 23 of the sensing pixel 130(C1,R3). The period in which the selection signal SEL3 is at the high voltage level is the period Psense in which the sensing pixel 130(C1, R3) performs the sensing operation. The reset signal RST is at a high voltage level in a period between a time point T1 and a time point T2 later than the time point T1 to form a reset phase PRST. The reset transistor 21 is turned on by the reset phase PRST to reset the voltage level at the floating diffusion node FN to the voltage level of the voltage source VDD. At this time, the output transistor 220 operates according to the reset voltage level at the floating diffusion node FN to generate an output signal SO_R3 with the voltage level $V_{RST}$. The sample and hold circuit 24 samples and holds the voltage level $V_{RST}$ of the output signal SO_R3 through the bit line BL1 according to at least one control signal S12C. At the time point T2, the reset signal RST is switched to a low voltage level to turn off the reset transistor 21. Then, the transfer signal TX is switched to a high voltage level at a time point T3 and remains at the high voltage level in the period from the time point T3 to a time point T4 to turn on the transfer transistor 20. At this time, the photoelectric diode 20 changes the voltage level at the floating diffusion node FN according to the charges which are generated according to the light sensed by the photoelectric diode PD. The output transistor 220 operates according to the changed voltage level at the floating diffusion node FN to generate the output signal SO_R3 with the voltage level $V_{SIG}$. The sample and hold circuit 24 samples the voltage level $V_{SIG}$ of the output signal SO_R3 according to the at least one control signal S 12C. Through the operation characteristics of the capacitors in the sample and hold circuit 24, the sample and hold circuit 24 holds the difference between the voltage level $V_{RST}$ and the voltage level $V_{SIG}$ (that is, the voltage difference ($V_{RST}-V_{SIG}$)). After the period Psense of the sensing operation, the sample and hold circuit 24 generates a sample-hold signal S24_R3 to represent the voltage difference ($V_{RST}-V_{SIG}$) and outputs the sample-hold signal S24_R3 to the negative input terminal (−) of the comparator 250. In FIG. 3, the reference sign "S/H" represents the operation state of the sample and hold circuit 24 of the readout unit 11_1, wherein the state "S/H_R3" represents the state in which the sample and hold circuit 24 performs the sample and hold operation on the output signal SO_R3 generated by the sensing pixel 130 in the column C1 and the row R3, and the state "S/H_R4" represents the state in which the sample and hold circuit 24 performs the sample and hold operation on the output signal SO_R4 generated by the sensing pixel 130 in the column C1 and the row R4. According to the above description, since the difference between the voltage level $V_{RST}$ and the voltage level $V_{SIG}$ of the output signal SO_R3 is obtained before the analog-digital conversion circuit 25, the operation which is perform by the readout unit 11_1 for the output signal SO_R3 can be referred to as "analog correlated double sampling".

Referring to FIG. 3, when the readout circuit 11 is in the single-ramp mode, the ramp generator 110 is controlled by the control signal S12D from the controller 12 to generate the ramp signal S110 having a ramp pulse RAMP30. When the ramp pulse RAMP30 is occurring on the ramp signal S110, the voltage level of the ramp signal S110 lowers gradually by a fixed slop in the duration Pramp20. One ramp pulse RAMP30 corresponds to the readout operation for the output signal of one sensing pixel. In details, for the output signal from each sensing pixel 130, the corresponding readout unit performs the readout operation by using only one ramp pulse RAMP30. After the period Psense of the sensing operation, the counter 251 starts performing the counting operation according to the clock signal CK, and the comparator 250 compares the ramp signal S110 with the sample-hold signal S24_R3. When the voltage level of the ramp signal S110 is higher than the voltage level of the sample-hold signal S24_R3, the comparator 250 generates a comparison signal S250_R3 with a high voltage level, and the counter 251 continuously performs the counting operation in response to the comparison signal S250_R3 with the high voltage level. With the gradual lowering in the voltage level of the ramp signal S110 in response to the ramp pulse RAMP30, the comparator 250 generates the comparison signal S250_R3 with a low voltage level once the voltage level of the ramp signal S110 is lower than the voltage level of the sample-hold signal S24_R3. At this time, the counter 251 stops performing the counting operation in response to the comparison signal S250_R3 with the low voltage level and outputs the final counting value as an output datum S251_R3 which is provided to the memory 26. The controller 12 controls the memory bank 26A through the control signal S12A to store the output datum S251_R3. Referring to FIG. 3, the reference sign "BANKA" represent the operation state of the memory bank 26A, and the reference sign "BANKB" represent the operation state of the memory bank 26B, wherein the state "W_RX" represents the state of writing of the output datum corresponding to the sensing pixel 130 arranged in the column C1 and row RX, the state "R_RX" represents the state of reading of the output datum corresponding to the sensing pixel 130 arranged in the column C1 and row RX, and the state "IDLE" represent an idle state, 1≤X≤n. According to the above description, the duration Pramp20 of the ramp pulse RAMP30 corresponds to the writing of the output datum. After the memory bank 26A completes the writing of the output datum S251_R3, the memory bank 26A enters the IDLE state. During the period in which the state W_R3 and the following IDLE state of the memory bank 26A occur, the memory bank 26B is in the state R_R2 according to the control signal S12B, and the output datum of the sensing pixel 130 arranged in the column C1 and the row R2, which is stored in the memory bank 26B previously, is read out and provided to one input terminal of the multiplexer 270.

When the selection signal SEL4 is at a high voltage level to turn on the selection switch 23 of the sensing pixel 130(C1,R4), the sensing pixel 130(C1,R4) performs the similar sensing operation which has been described above to generate an output signal SO_R4. The elements/circuits in the readout unit 11_1 performs the similar readout operation which has been described above according to the output signal SO_R4 to generate a sample-hold signal S24_R4, a comparison signal S250_R4, and an output datum S251_R4. The description related to the operations of the elements/circuits in the sensing pixel 130(C1,R4) and the readout unit 11_1 is omitted here. The controller 12 controls the memory bank 26B through the control signal S 12B to store the output datum S251_R4. Referring to FIG. 3, after the memory bank 26B completes the writing of the output datum S251_R4, the memory bank 26B enters the IDLE state. During the period in which the state W_R4 and the following IDLE state of the memory bank 26B occur, the memory bank 26A is in the state R_R3 according to the control signal S12A, and the output datum S251_R3 of the sensing pixel 130(C1,R3), which is stored in the memory bank 26A previously, is read out and provided to the other input terminal of the multiplexer 270.

According to the above description, the output datums from the counter 251 are stored into the memory banks 26A and 26B alternately, and the output datums stored in the memory banks 26A and 26B are read out according to the writing order and provided to the multiplexer 270. Accordingly, the multiplexer 270 is controlled by the control signal S12E to alternately transmit the output datum from the memory bank 26A and the output datum from the memory bank 26B to the output terminal of the multiplexer 270. In the single-ramp mode, the multiplexer 271 outputs the output datum from the multiplexer 270 according to the control signal S12F to serve as the image datum DOUT1.

Figure 4:
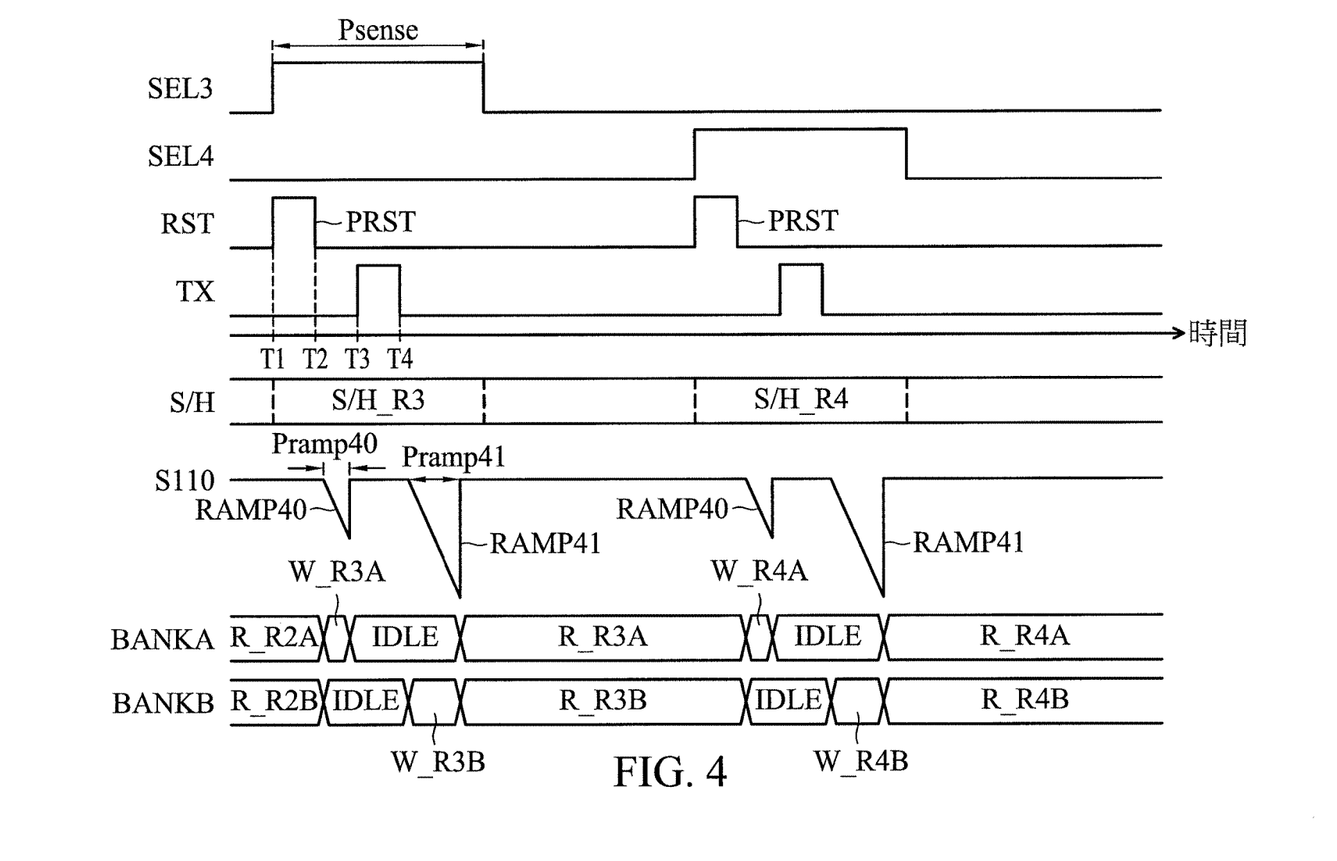
FIG. 4 shows a timing chart of main signals of a sensing device in a dual-ramp mode according to an exemplary embodiment.

FIG. 2B also shows the schematic view of the operation of the sensing device 1 in the dual-ramp mode. FIG. 4 shows the timing chart of the main signals of the sensing device 1 in the dual-ramp mode. Referring to FIGS. 2B and 4, the selection signal SEL3 is at a high voltage level to turn on the selection switch 23 of the sensing pixel 130(C1,R3). The period in which the selection signal SEL3 is at the high voltage level is the period Psense in which the sensing pixel 130(C1, R3) performs the sensing operation. The reset signal RST is at a high voltage level in a period between a time point T1 and a time point T2 later than the time point T1 to form a reset phase PRST. The reset transistor 21 is turned on by the reset phase PRST to reset the voltage level at the floating diffusion node FN to the voltage level of the voltage source VDD. At this time, the output transistor 220 operates according to the reset voltage level at the floating diffusion node FN to generate an output signal SO_R3 with the voltage level $V_{RST}$. The sample and hold circuit 24 samples and holds the voltage level $V_{RST}$ of the output signal SO_R3 through the bit line BL1 according to at least one control signal S12C. At the time point T2, the reset signal RST is switched to a low voltage level to turn off the reset transistor 21. The sample and hold circuit 24 generate a sample-hold signal S24_R3A to represent the voltage level $V_{RST}$ and outputs the sample-hold signal S24_R3A to the negative input terminal (−) of the comparator 250. In FIG. 4, the reference sign "S/H" represents the operation state of the sample and hold circuit 24 of the readout unit 11_1, wherein the state "S/H_R3A" represents the state in which the sample and hold circuit 24 performs the sample and hold operation on the output signal SO_R3 generated by the sensing pixel 130 in the column C1 and the row R3, and the state "S/H_R4" represents the state in which the sample and hold circuit 24 performs the sample and hold operation on the output signal SO_R4 generated by the sensing pixel 130 in the column C1 and the row R4.

When the readout circuit 11 is in the dual-ramp mode, after the time point T2, the ramp generator 110 is controlled by the control signal S12D from the controller 12 to generate the ramp signal S110 having a ramp pulse RAMP40 and a ramp pulse RAMP41. In details, after the time point T2, the ramp pulse RAMP40 occurs on the ramp signal S110 first, and then the ramp pulse RAMP41 occurs on the ramp signal S110. When the ramp pulse RAMP40 is occurring on the ramp signal S110, the voltage level of the ramp signal S110 lowers gradually by a fixed slop in the duration Pramp40; when the ramp pulse RAMP41 is occurring on the ramp signal S110, the voltage level of the ramp signal S110 lowers gradually by the fixed slop in the duration Pramp41, wherein the duration Pramp41 is longer than the duration Pramp40. Each set of the ramp pulses RAMP40 and RAMP41 corresponds to the readout operation for the output signal of one sensing pixel. In details, for the output signal from each sensing pixel 130, the corresponding readout unit performs the readout operation by using only one set of the ramp pulses RAMP40 and RAMP41. After the time point T2, the counter 251 starts performing the counting operation according to the clock signal CK, and the comparator 250 compares the ramp signal S110 with the sample-hold signal S24_R3A. When the voltage level of the ramp signal S110 is higher than the voltage level of the sample-hold signal S24_R3A, the comparator 250 generates a comparison signal S250_R3A with a high voltage level, and the counter 251 continuously performs the counting operation in response to the comparison signal S250_R3A with the high voltage level. With the gradual lowering in the voltage level of the ramp signal S110 in response to the ramp pulse RAMP40, the comparator 250 generates the comparison signal S250_R3A with a low voltage level once the voltage level of the ramp signal S110 is lower than the voltage level of the sample-hold signal S24_R3A. At this time, the counter 251 stops performing the counting operation in response to the comparison signal S250_R3A with the low voltage level and outputs the final counting value as a first output datum S251_R3A which is provided to the memory 26. After the first output datum S251_R3A is provided to the memory 26, the counter 251 is reset. At this time, the controller 12 controls the memory bank 26A through the control signal S12A to store the output datum S251_R3A. Referring to FIG. 4, the reference sign "BANKA" represent the operation state of the memory bank 26A, and the reference sign "BANKB" represent the operation state of the memory bank 26B, wherein the state "W_RXA" represents the state writing of the first output datum corresponding to the sensing pixel 130 arranged in the column C1 and row RX during one period Psense, the reference sign "W_RXB" represents the state of writing of the second output datum corresponding to the sensing pixel 130 arranged in the column C1 and row RX during one period Psense, 1≤X≤n. Moreover, the state "R_RXA" represents the state of reading of the first output datum corresponding to the sensing pixel 130 arranged in the column C1 and row RX, and the reference sign "R_RXB" represents the state of reading of the second output datum corresponding to the sensing pixel 130 arranged in the column C1 and row RX. The state "IDLE" represents an idle state. According to the above description, the duration Pramp40 of the ramp pulse RAMP40 corresponds to the writing of the first output datum S251_R3A. After the memory bank 26A completes the writing of the output datum S251_R3A (that is, after the state W_R3A), the memory bank 26A enters the IDLE state. During the period of the state W_R3A, the memory bank 26B is in the IDLE state according to the control signal S 12B and remains in the IDLE state until the duration Pramp41 of the ramp pulse RAMP41 of the ramp signal S110 occurs.

Then, the transfer signal TX is switched to a high voltage level at a time point T3 and remains at the high voltage level in the period from the time point T3 to a time point T4 to turn on the transfer transistor 20. At this time, the photoelectric diode 20 changes the voltage level at the floating diffusion node FN according to the charges which are generated according to the light sensed by the photoelectric diode PD. The output transistor 220 operates according to the changed voltage level at the floating diffusion node FN to generate the output signal SO_R3 with the voltage level $V_{SIG}$. The sample and hold circuit 24 samples and holds the voltage level $V_{SIG}$ of the output signal SO_R3 through the bit line BL1 according to the at least one control signal S12C. At the time point T4, the transfer signal TX is switched to a low voltage level to turn off the transfer transistor 20. The sample and hold circuit 24 generates a sample-hold signal S24_R3B which represents the voltage level $V_{SIG}$ and outputs the sample-hold signal S24_R3B to the negative input terminal (−) of the comparator 250.

After the time point T4, the counter 251 starts performing the counting operation according to the clock signal CK, and the comparator 250 compares the ramp signal S110 with the sample-hold signal S24_R3B. When the voltage level of the ramp signal S110 is higher than the voltage level of the sample-hold signal S24_R3B, the comparator 250 generates a comparison signal S250_R3B with a high voltage level, and the counter 251 continuously performs the counting operation in response to the comparison signal S250_R3B with the high voltage level. With the gradual lowering in the voltage level of the ramp signal S110 in response to the ramp pulse RAMP41, the comparator 250 generates the comparison signal S250_R3B with a low voltage level once the voltage level of the ramp signal S110 is lower than the voltage level of the sample-hold signal S24_R3B. At this time, the counter 251 stops performing the counting operation in response to the comparison signal S250_R3B with the low voltage level and outputs the final counting value as a second output datum S251_R3B which is provided to the memory 26. At this time, the controller 12 controls the memory bank 26B through the control signal S12B to store the second output datum S251_R3B. As described above, the duration Pramp41 of the ramp pulse RAMP41 corresponds to the writing of the first output datum S251_R3B. After the memory bank 26B completes the writing of the output datum S251_R3B (that is, after the state W_R3B), the memory bank 26A enters the state R_R3A, and the first output datum S251_R3A of the sensing pixel 130(C1,R3), which is stored in the memory bank 26A previously, is read out and provided to the subtracter 272. Meanwhile, the memory bank 26B enters the state R_R3B, and the second output datum S251_R3B of the sensing pixel 130(C1,R3), which is stored in the memory bank 26B, is read out and provided to the subtracter 272.

The subtracter 272 performs a subtraction operation on the first output datum S251_R3A and the second output datum S251_R3B to obtain the difference therebetween and generate a corresponding a valid readout datum S272. The valid readout datum S272 represents the difference between the voltage level $V_{RST}$ and the voltage level $V_{SIG}$ of the output signal SO_R3 in the digital form. Since the valid readout datum S272 is generated in the digital domain, the operation which is perform by the readout unit 11_1 for the output signal SO_R3 can be referred to as "digital correlated double sampling". The subtracter 272 transmits the valid readout datum S272 to one input terminal of the multiplexer 272. In the dual-ramp mode, the multiplexer 272 outputs the valid readout datum S272 from the subtracter 272 according to the control signal S12F to serve as the image datum DOUT1.

When the selection signal SEL4 is at a high voltage level to turn on the selection switch 23 of the sensing pixel 130(C1,R4). The sensing pixel 130(C1,R4) performs the similar sensing operation which has been described above to generate an output signal SO_R4, and the elements/circuits in the readout unit 11_1 performs the similar readout operation which has been described above. Thus, the description related to the operations of the elements/circuits in the sensing pixel 130(C1,R4) and the readout unit 11_1 is omitted here.

According to the above embodiments, the readout circuit 11 is controlled by the controller 12 to selectively operate in the single-ramp mode or the dual-ramp mode. When the readout circuit 11 operates in the single-ramp mode, the output datums respectively generated from the sensing pixels in the same column are alternately written into the memory banks 26A and 26B. In this case, when one memory bank is in a writing state, the other memory bank is in a reading state. Thus, the period of the readout operation performed by the readout circuit 11 can be shortened, thereby increasing the frame refresh rate. When the readout circuit 11 operates in the dual-ramp mode, each readout unit performs the analog-digital conversion operation twice on the output signal from one sensing pixel to perform the digital correlated double sampling, thereby enhancing the accuracy of the image datums.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A readout circuit for generating an image datum to represent an image sensed by a sensing array, comprising:
   a sample and hold circuit performing a sample and hold operation on at least one output signal from the sensing array to generate a first sample-hold signal and a second sample-hold signal;
   an analog-digital conversion circuit receiving the first sample-hold signal and the second sample-hold signal and generating a first output datum and a second output datum according to the first sample-hold signal and second sample-hold signal respectively;
   a first memory bank storing the first output datum;
   a second memory bank storing the second output datum; and
   an output circuit, coupled to the first memory bank and the second memory bank, receiving the first output datum and the second output datum,
   wherein when the readout circuit operates in a first mode, the output circuit outputs the first output datum and the second output datum sequentially to serve as the image datum, and wherein when the readout circuit operates in a second mode, the output obtains difference between the first output datum and second output datum to serve as the image datum.

2. The readout circuit as claimed in claim 1,
wherein the the sensing array comprises a plurality of sensing pixel,
wherein when the readout circuit operates in the first mode, the sample and hold circuit performs the sample and hold operation on a first output signal and a second output signal from the sensing array to generate the first sample-hold signal and the second sample-hold signal respectively, and
wherein the first output signal and the second output signal are generated from different sensing pixels in the sensing array.

3. The readout circuit as claimed in claim 2, wherein when the readout circuit operates in the first mode, the analog-digital conversion circuit generates the first output datum according to a ramp pulse and the first sample-hold signal and further generates the second output datum according to the ramp pulse and the second sample-hold signal.

4. The readout circuit as claimed in claim 1,
wherein the sensing array comprises a plurality of sensing pixels,
wherein when the readout circuit operates in the second mode, the sample and hold circuit performs the sample and hold operation on a first output signal from the sensing array to generate the first sample-hold signal and the second sample-hold signal, and
wherein the first output signal is generated from one sensing pixel in the sensing array.

5. The readout circuit as claimed in claim 4,
wherein when the readout circuit operates in the second mode, the analog-digital conversion circuit generates the first output datum according to a first ramp pulse and the first sample-hold signal and further generates the second output datum according to a second pulse and the second sample-hold signal, and
wherein a duration of the second ramp pulse is longer than a duration of the first ramp pulse.

6. The readout circuit claimed in claim 1, wherein the output circuit comprises:
a first multiplexer coupled to the first memory bank and the second memory bank to receive the first output datum and the second output datum;
a subtracter coupled to the first memory bank and the second memory bank to receive the first output datum and the second output datum; and
a second multiplexer, coupled to an output terminal of the first multiplexer and an output terminal of the subtracter, generating the image datum.

7. The readout circuit claimed in claim 6,
wherein when the readout circuit operates in the first mode, the first multiplexer outputs the first output datum and the second output datum sequentially to the second multiplexer, and the second multiplexer outputs the first output datum and the second output datum from the first multiplexer to serve as the image datum; and
wherein when the readout circuit operates in the second mode, the subtracter calculates the difference between the first output datum and second output datum to generate a valid readout datum, and the second multiplexer outputs the valid readout datum to serve as the image datum.

8. The readout circuit claimed in claim 1, wherein the analog-digital conversion circuit comprises:
a comparator performing a comparison operation on the first output signal and the second output signal according to a ramp signal respectively; and
a counter performing a counting operation according to a result of the comparison operation corresponding to the first output signal to generate the first output datum and performing the counting operation according to a result of the comparison operation corresponding to the second output signal to generate the second output datum.

9. The readout circuit as claimed in claim 8,
wherein when the readout circuit operates in the first mode, the comparator performs the comparison operation on the first output signal and the second output signal according to a first ramp pulse of the ramp signal respectively,
wherein when the readout circuit operates in the second mode, the comparator performs the comparison operation on the first output signal according to a second ramp pulse of the ramp signal and performs the comparison operation on the second output signal according to the first ramp pulse of the ramp signal, and
wherein a duration of the first ramp pulse is longer than a duration of the second ramp pulse.

10. The sensing device as claimed in claim 1,
wherein, for each readout circuit, when the readout circuit operates in the second mode, the sample and hold circuit performs the sample and hold operation on a first output signal from the corresponding bit line to generate the first sample-hold signal and the second sample-hold signal, and
wherein the first output signal is generated from one sensing pixel in the corresponding column of the sensing array.

11. The sensing device as claimed in claim 10,
wherein for each readout circuit, when the readout circuit operates in the second mode, the analog-digital conversion circuit generates the first output datum according to a first ramp pulse and the first sample-hold signal and further generates the second output datum according to a second pulse and the second sample-hold signal, and
wherein a duration of the second ramp pulse is longer than a duration of the first ramp pulse.

12. A sensing device comprising:
a sensing array comprising a plurality of sensing pixels arranged in a plurality of columns and a plurality of rows;
a plurality of bit lines coupled to the sensing array, wherein the sensing pixels arranged in the same column are coupled to the same bit line; and
a readout circuit, coupled to the plurality of bit lines, generating a plurality of image datums to represent an image sensed by the sensing array,
wherein the readout circuit comprises a plurality of readout units coupled to the bit lines respectively, and each readout unit generates one corresponding image datum and comprises:
a sample and hold circuit, coupled to the corresponding bit line to receive at least one output signal, performing a sample and hold operation on the at least one output signal to generate a first sample-hold signal and a second sample-hold signal;
an analog-digital conversion circuit receiving the first sample-hold signal and the second sample-hold signal and generating a first output datum and a second output datum according to the first sample-hold signal and second sample-hold signal respectively;
a first memory bank storing the first output datum;
a second memory bank storing the second output datum; and
an output circuit, coupled to the first memory bank and the second memory bank, receiving the first output datum and the second output datum,
wherein when the readout circuit operates in a first mode, the output circuit outputs the first output datum and the second output datum sequentially to serve as the image datum, and
wherein when the readout circuit operates in a second mode, the output obtains difference between the first output datum and second output datum to serve as the corresponding image datum.

13. The sensing device as claimed in claim 12,
wherein, for each readout unit, when the readout circuit operates in the first mode, the sample and hold circuit performs the sample and hold operation on a first output signal and a second output signal from the corresponding bit line to generate the first sample-hold signal and the second sample-hold signal respectively, and
wherein the first output signal and the second output signal are generated from different sensing pixels in the same column of the sensing array.

14. The sensing device as claimed in claim 13, wherein, for each readout unit, when the readout circuit operates in the first mode, the analog-digital conversion circuit generates the first output datum according to a ramp pulse and the first sample-hold signal and further generates the second output datum according to the ramp pulse and the second sample-hold signal.

15. The sensing device claimed in claim 12, wherein for each readout unit, the output circuit comprises:
a first multiplexer coupled to the first memory bank and the second memory bank to receive the first output datum and the second output datum;
a subtracter coupled to the first memory bank and the second memory bank to receive the first output datum and the second output datum; and
a second multiplexer, coupled to an output terminal of the first multiplexer and an output terminal of the subtracter, generating the corresponding image datum.

16. The sensing device claimed in claim 15,
wherein when the readout circuit operates in the first mode, the first multiplexer outputs the first output datum and the second output datum sequentially to the second multiplexer, and the second multiplexer outputs the first output datum and the second output datum from the first multiplexer to serve as the corresponding image datum; and
wherein when the readout circuit operates in the second mode, the subtracter calculates the difference between the first output datum and second output datum to generate a valid readout datum, and the second multiplexer outputs the valid readout datum to serve as the corresponding image datum.

17. The sensing device claimed in claim 12, wherein for each readout unit, the analog-digital conversion circuit comprises:
a comparator performing a comparison operation on the first output signal and the second output signal according to a ramp signal respectively; and
a counter performing a counting operation according to a result of the comparison operation corresponding to the first output signal to generate the first output datum and performing the counting operation according to a result of the comparison operation corresponding to the second output signal to generate the second output datum.

18. The sensing device as claimed in claim 17,
wherein when the readout circuit operates in the first mode, the comparator performs the comparison operation on the first output signal and the second output signal according to a first ramp pulse of the ramp signal respectively,
wherein when the readout circuit operates in the second mode, the comparator performs the comparison operation on the first output signal according to a second ramp pulse of the ramp signal and performs the comparison operation on the second output signal according to the first ramp pulse of the ramp signal, and
wherein a duration of the first ramp pulse is longer than a duration of the second ramp pulse.

19. The sensing device as claimed in claim 17, wherein the first mode is a single-ramp mode, and the second mode is a dual-ramp mode.

* * * * *